United States Patent
Carrara et al.

(10) Patent No.: US 6,300,895 B1
(45) Date of Patent: Oct. 9, 2001

(54) DISCREET RADAR DETECTION METHOD AND SYSTEM OF IMPLEMENTATION THEREOF

(75) Inventors: Bruno Carrara, Meudon; Michel Pecot, Thorigne Fouillard; Philippe Tourtier, Rennes, all of (FR)

(73) Assignee: Thomson-CSF, Paris (FR)

( * ) Notice: Subject to any disclaimer, the term of this patent is extended or adjusted under 35 U.S.C. 154(b) by 873 days.

(21) Appl. No.: 08/800,627

(22) Filed: Feb. 14, 1997

Related U.S. Application Data

(63) Continuation of application No. 08/432,068, filed on May 1, 1995, now abandoned.

(30) Foreign Application Priority Data

May 2, 1994 (FR) .................................................. 94 05318

(51) Int. Cl.$^7$ .................................................. G01S 13/00
(52) U.S. Cl. .................................................. 342/55
(58) Field of Search .................................................. 342/55

(56) References Cited

U.S. PATENT DOCUMENTS

| | | |
|---|---|---|
| 4,041,489 | 8/1977 | Lewis . |
| 4,450,444 | 5/1984 | Wehner et al. . |
| 4,622,555 | 11/1986 | Doggett et al. . |
| 4,851,848 | 7/1989 | Wehner . |
| 4,972,194 | 11/1990 | Carrara et al. . |
| 5,021,782 | 6/1991 | Perron et al. . |
| 5,113,193 | 5/1992 | Powell et al. . |
| 5,140,621 | 8/1992 | Perron et al. . |
| 5,202,760 | 4/1993 | Tourtier et al. . |
| 5,278,915 | 1/1994 | Chupeau et al. . |
| 5,291,289 | * 3/1994 | Hulyalkar et al. .................... 348/723 |
| 5,361,072 | * 11/1994 | Barrick et al. ........................ 342/133 |
| 5,481,270 | * 1/1996 | Urkowitz et al. ..................... 342/101 |

OTHER PUBLICATIONS

Hershey et al, "An Adjunct Tracking System for Low Altitude Sector Aircraft", IEEE Transactions on Broadcasting, vol. 40, No. 1, Mar. 1994.*
Patent Abstract of Japan, vol. 13, No. 57 (P–825) Feb. 9, 1989 & JP–A–63 247 682 (Tech. Res. & Dev. Inst. of Japan Def. Agency) Oct. 14, 1988.
I.E.E. Proceedings, vol. 133–F, No. 7, Dec. 1986, pp. 649–657, Griffiths et al. "Television–Based Bistatic Radar".

* cited by examiner

*Primary Examiner*—Ian J. Lobo
(74) *Attorney, Agent, or Firm*—Oblon, Spivak, McClelland, Maier & Neustadt, P.C.

(57) ABSTRACT

The radar system of the invention uses a digital television network to make a multistatic configuration. The transmitted signal is of the OFDM type. The receiver or receivers carry out a matched filtering operation and recover the synchronization by processing of zero-value Doppler gates.

12 Claims, 7 Drawing Sheets

DISCREET RADAR DETECTION METHOD AND SYSTEM OF IMPLEMENTATION THEREOF

This application is a continuation of application Ser. No. 08/432,068, filed on May 1, 1995, now abandoned.

BACKGROUND OF THE INVENTION

1. Field of the Invention

The present invention relates to a method of discreet radar detection as well as a system for the implementation of this method.

Multistatic radar systems have many advantages, notably as regards:

the discretion of the reception stations which are entirely passive and therefore practically invulnerable to electronic warfare means;

the possibility of detecting targets which, since they are seen at angles different from those that they present for standard monostatic radars, find it difficult to remain discreet;

the capacity to operate in an environment of clutter and the possibility of implementing waveforms with high repetition frequency.

However, these systems require the laying out of a network of stations. This makes them expensive.

2. Description of the Prior Art

It has therefore become necessary to use stations that are already set up and normally designed for another use but can easily be adapted to radar use. Thus, it has been proposed (H. D. Griffiths, N.R.W. Long, "Television based bistatic radar", IEE Proceedings, Vol. 133, No. 7, December 1986), to use stations that broadcast analog television signals of the PAL, SECAM or NTSC type to detect airborne targets. This has proved to be difficult to implement. The authors of the above-mentioned article have then proposed the use of waveforms based on the standard pulsed transmissions of radars. However, this approach is limited by the operating constraints of television broadcasting transmitters, which are not compatible with pulsed signals such as those of standard radars.

SUMMARY OF THE INVENTION

An object of the present invention is a method and a system of discreet radar detection preferably using an existing network of transmission and reception stations that is dense enough to provide for sufficient radar coverage of the geographical zone monitored, given the transmission power in radar use that may be provided by the transmission stations, the modifications made to the existing network being as simple as possible in their implementation while at the same time enabling the setting up of a multistatic system with performance characteristic similar to those of standard multistatic systems. Should a network be created, it should be as inexpensive as possible while at the same time providing for efficient radar coverage of the zone to be monitored and a high degree of discretion. In the event of application to a monostatic radar, it should be capable of providing for radar detection as efficient as that of standard radar, with improved discretion.

The method according to the invention consists, at transmission, in producing an encoded waveform from a multicarrier signal repeated on at least N periods and, at reception, in carrying out a matched filtering operation on an integration time of N periods, N being preferably greater than ten, and being possibly equal to one for a monostatic radar. N determines the Doppler selectivity.

The radar detection system according to the invention comprises at least one transmitter and at least one receiver, the transmitter comprising a multicarrier encoded wave generator, the receiver comprising at least one distance gate processing stage, advantageously complemented by a Doppler gate processing stage.

BRIEF DESCRIPTION OF THE DRAWINGS

The invention will be understood more clearly from the following detailed description of an embodiment, taken as a non-restrictive example and illustrated by the appended drawing, of which.

DETAILED DESCRIPTION OF THE PREFERRED EMBODIMENTS

Figure 1:
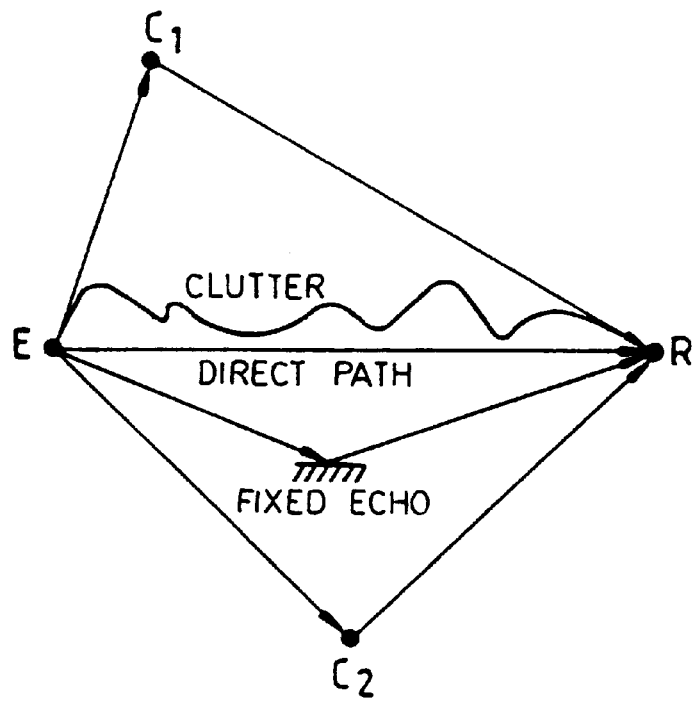
FIG. 1 shows an exemplary drawing representing the propagation of signals between a transmitter and receiver of the system according to the invention.

The invention is described here below with reference to the use of an existing network for the broadcasting of television signals. However, it is clearly not limited to this use alone. It can also be extended to the use of an existing network (RF beams for example) at least partially compatible with the transmission and reception of digital television type signals as described here below as well as to the combined use of an existing network and transmitters and/or additional receivers, should the existing network be not sufficiently dense, and even to the making of a specific multistatic network or of a monostatic radar. In the following description, the term "bistatic" is used with reference to examples, but it is clear that these examples could be extended to a multistatic system.

Recent studies in the field of RF digital transmission have brought out all the utility of multicarrier modulation in multiple-path situations (involving echoes). In the standard single-carrier approach, each elementary information element transmitted occupies the entire spectral band available, for a minimum time interval. Conversely, the OFDM (orthogonal frequency division multiplexing) multicarrier approach allocates a small part of the useful frequency band on a greater time interval to each information element.

In the presence of a frequency-selective channel (as is the case in a multiple-path situation), the latter approach permits an identification and compensation of the response of the channel (in other words of the echoes), this identification and compensation being more efficient and easier to implement by fast Fourier transform (FFT).

Now, it is specifically the echoes coming from possible targets that the radar receiver must detect. The potential worth of such a waveform can thus be seen. Another advantage of this approach is that it enables the transmitters to be made to work continuously, namely with power output values far greater than in the case of pulse radars.

The waveform used is defined from the weighted sum of M orthogonal carriers (frequentially separated by $\Delta f$):

$$s(t) = \sum_{k=0}^{M-1} c_k \cdot e^{2\pi jk\Delta f t}$$

The weighting coefficients $c_k$ are complex numbers. Unlike in the case of digital transmission, where these coefficients carry the information to be transmitted on durations $T_m=1/\Delta f$, they are chosen to be fixed on N successive periods $T_m$, according to the invention, so as to confer good radar behavior on the resultant signal.

The use of the coefficients $c_k$ which are invariant from one packet (namely the set of the M carriers produced during a period) to another provides for the stationary character of the transmitted signal which becomes periodic with a period $T_m$. This makes it possible to envisage the performance, at reception, of a standard operation of matched-filter processing during an integration time of N periods.

In a bistatic configuration, a matched-filter operation such as this enables the estimation of the differential distance D (the difference between, on the one hand, the sum of the transmitter-target and receiver-target distances and, on the other hand, the transmitter-receiver distance) as well as the apparent bistatic velocity v (the algebraic sum of the radial velocities from the target to the transmitter and from the target to the receiver). In a monostatic configuration, the distance values and radial velocity values are obtained in a way that is similar to the one used in standard radars. The coherent integration on N periods of the received signal is necessary firstly to increase the energy balance and secondly to obtain the desired discrimination on the Doppler axis. This integration time is however limited by the characteristics of temporal fluctuation of the SER (surface equivalent radar) of the targets and by their maximum velocity. The latter constraint is equivalent to an assumption that the signal received is a narrow-band signal. This amounts to considering that the Doppler phenomenon affects each of the subcarriers in the same way or, in other words, that the variation in distance of the target during the integration time remains small in relation to the resolution in distance of the receiver. It is expressed by:

$$N \ll c/Mv$$

where c represents the velocity of light and v the apparent velocity of the target.

After modulation by the RF carrier with a frequency $f_0$, the signal transmitted is written as follows:

$$e(t)=Re(\alpha_0.s(t).e^{2\pi jf_0 t})$$

where $\alpha_0$ is a positive real number determining the mean power $P_e$ transmitted:

$$\alpha_0^2=P_e/M$$

The signal received in the receiver is formed by the sum of the various contributions summarized in FIG. 1, namely:

moving targets ($C_1$, $C_2$)
direct path (in fact, minimum stationary path)
fixed echoes (reflections on fixed structures of the relief)
ground clutter
antenna noise+inherent noise of the receiver brought to the input.

Under the narrow band condition expressed here above, the signal received from a target for a period $N.T_m$ is expressed, after demodulation by the carrier $f_0$, in the form:

$$z(t)=\alpha.s(t-t_0-\tau).e^{-2\pi jf_0(\tau+t_0)}.e^{2\pi jf_d(t-t_0)}.\Pi_{NT_m}(t-t_0-\tau)$$

where $\Pi_{NT_m}(t)$ is the characteristic function of the interval $[0, NT_M]$ where $t_0$ is a parameter that is unknown but constant irrespectively of the path (target, direct path, fixed echo etc.) simply expressing the difference in the location of the transmitter and the receiver. In monostatic systems, $t_0$ is zero.

$f_d$ and $\tau$ represent characteristics of the target, respectively its apparent Doppler frequency and its differential delay: $f_d=f_0.v/c$ and $\tau=D/c$.

Assuming white Gaussian noise, the optimum receiver (namely the one that maximizes the signal-to-noise ratio at its output) is the one that carries out the correlation (on $N.T_m$) of the received signal sampled at the frequency $f_e=M.\Delta f$ with:

$$U_{km}(t)=s(t-\tau_k).e^{2\pi jf_m t}$$

for pairs ($\tau_k$, $f_m$) sampling the distance-Doppler space. The modulus of the result is then taken and a search is made for the maximum values obtained after CFAR, these maximum values expressing the presence of one or more targets.

The values of the ambiguities of reception are deduced therefrom immediately:
ambiguous distance: $D_a=cT_m=C/\Delta f$
ambiguous velocity: $V_a=c\Delta f/f_0$ Similarly, a regular sampling of the distance/Doppler space compatible with the degree of estimating precision that can be achieved may be chosen according to:
width of the distance gate: $D_p=cT_M/M$ (giving M distance gates)
width of the Doppler gate: $V_p=c \Delta f/Nf_0$ (giving N Doppler gates).

The pairs ($\tau_k$, $f_m$) are therefore given by:
$\tau_k=k.T_m/M$, k varying from 0 to M−1
$f_m=m.\Delta f/n$, m varying from 0 to N−1.

The coefficients $c_k$, for their part, have to be chosen so as to optimize the compromise between the width of the major lobe and the levels of the minor lobes of the ambiguity function.

It is then shown that, for an assumption on the Doppler frequency of the targets, $f_d \ll \Delta f$, that the optimum receiver must compute the following (excluding standardization):

$$c(k, m) = \sum_{p=0}^{M-1} e^{2\pi jkp/M} \cdot C_p^* \sum_{l=0}^{M-1} e^{-2\pi jlp/M} \sum_{n=0}^{N-1} Z_{l,n} e^{-2\pi jmn/N}$$

for k varying from 0 to M-1 (distance index) and m from 0 to N-1 (Doppler index), where $$Z_{l,n}=z((l+nM).T_e)$$

is a sampling of the received signal.

The assumption $f_d \ll \Delta f$ is a relatively constraining one. When it is not truly verified (in the case of high-velocity targets), there appears a distance/Doppler coupling and a renewed increase in the number of ambiguity minor lobes.

Figure 2:
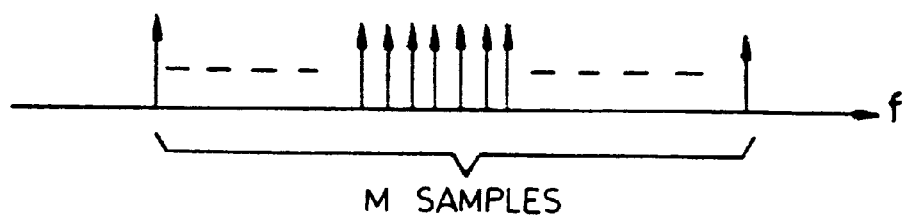
FIG. 2 shows a simplified example of a waveform in the frequency domain produced by the transmitters of the system according to the invention.

FIG. 2 shows a waveform that could be used by the system of the invention in the frequency domain. This waveform has M (for example M=512) carriers evenly spaced out with respect to one another, these M carriers being orthogonal.

Figure 3:
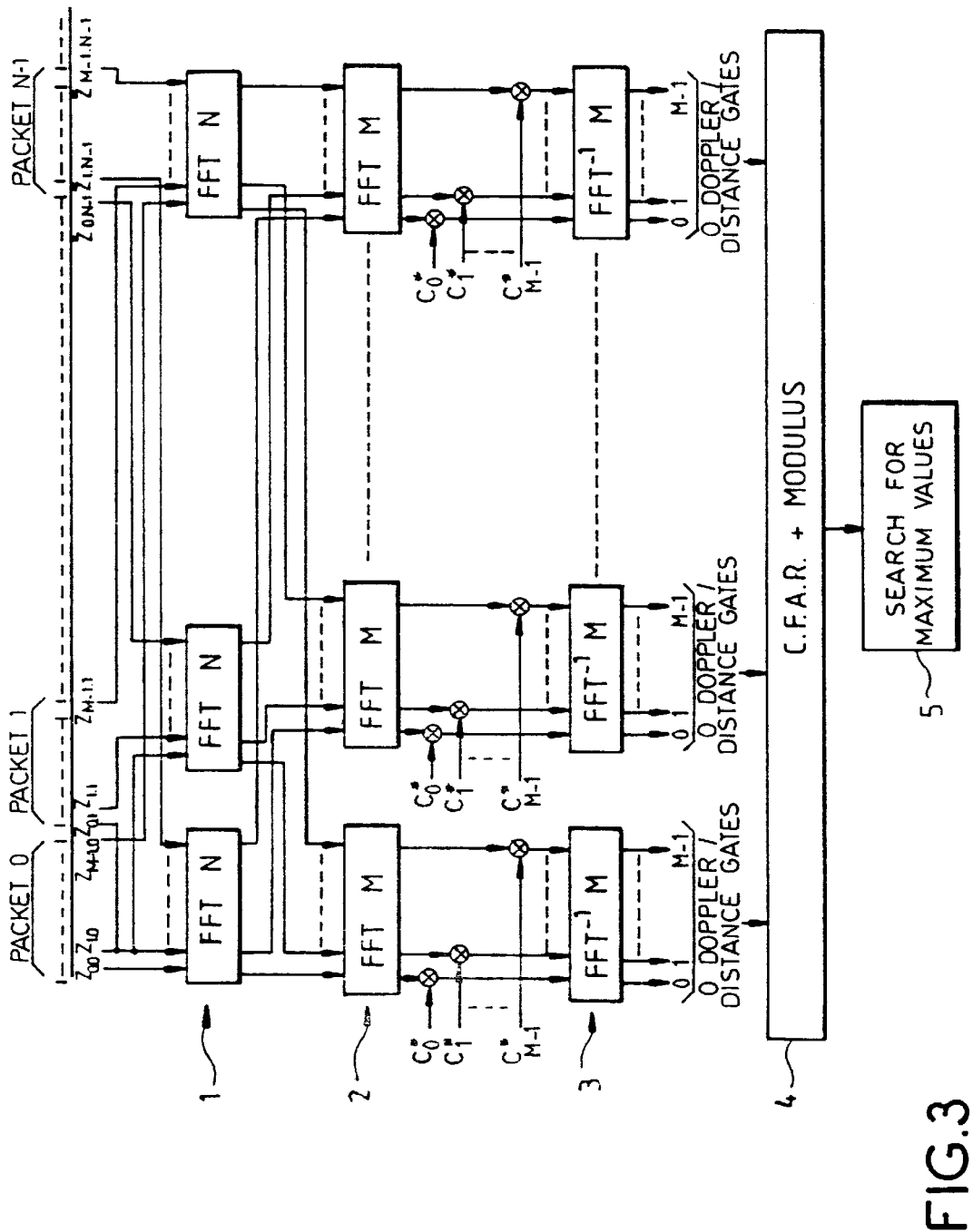
FIG. 3 is a simplified diagram of the distance and Doppler processing part of a receiver according to the invention.

FIG. 3 shows the distance gate and Doppler gate processing part of a receiver according to the invention. The signal received by the receiver is sampled by circuits (not shown) in a manner that is known per se. This sampling is done with a period of $T_e = T_m/M$ with intervals having a duration $NT_m$ (since there are NM samples for N periods of a signal comprising M samples).

The samples obtained are grouped together by indices of order of rank in the waveform, namely by distance gates. Thus, M groups of N samples each are obtained. Each of these M groups is sent to a corresponding FFT circuit of a first stage 1 comprising M such FFT circuits working in parallel. The FFT is done on N points in each of these circuits, and carries out a Doppler processing operation.

The samples are grouped together at output of the stage 1 according to their status of belonging to one of the N Doppler gates. Thus, N groups of M samples are obtained. Each of these N groups is sent to a corresponding FFT circuit of the next processing stage 2. The N circuits of the stage 2 each perform one FFT on M points. The different outputs of each of the circuits of the stage 2 are multiplied by $c_k^*$ (k ranging from 0 to M-1), the coefficients $c_k^*$ being those defined hereabove. The thus weighted outputs of the circuits of the stage 2 are sent in parallel to reverse FFT circuits of a stage 3. These circuits of the stage 3 each carry out a reverse FFT on M points for each of the N packets coming from the stage 2. Thus, a distance processing operation is carried out.

The outputs of the N circuits of the stage 3 are connected to a modulus-determining and false alarm regulation (CFAR) stage 4, itself connected to a stage 5 for searching for maximum values (the most powerful peak after the correlation of the different Doppler gates).

For example, for 512 carriers, an integration on 512 packets, a total band of 1.5 MHz and an RF carrier at 600 MHz, the characteristics of the receiver become:

$D_a$=100 km
$D_p$=200 m
$V_a$=1500 m/s
$V_p$=3 m/s

Under these conditions, a target with an SER value equal to one located at 20 km from the transmitter and from the receiver may be detected with a signal-to-noise ratio at processing output in the range of 15 dB for a transmission power value of 50 W only (assuming a total noise temperature of 1700° K.).

This receiver calls for a prior synchronization. In bistatic mode, it is performed on the binary train received on the direct path (between the transmitter and the receiver) in order to then carry out a differential delay processing operation as described here below. In monostatic mode, this synchronization is obtained naturally by means of the circuits internal to the radar.

The defect of the multicarrier waveform described here above is that, while its spectrum is perfectly controlled, its dynamic range is, on the contrary, greater. In order to prevent any intermodulation distortion between neighboring carriers at output of the transmitter (that entails clipping at amplification), it is therefore necessary to back off its operating point with respect to its nominal power by a ratio equal to the ratio of the peak power to the mean power of the OFDM signal. This backoff entails a reduction of the mean power transmitted.

The value of this backoff may be limited by a judicious choice of the coefficient $c_k$. Typically, in the case of coefficients with a modulus equal to one and with independent phases uniformly distributed on $[-\pi, +\pi]$, a backoff of the order of 8 dB is generally necessary.

The receiver described here above enables the measurement of delays without absolute reference, given the absence of synchronization between the transmitter and the receiver. This means an additional delay $t_0$ that is unknown but constant on each of the contributions of the received signal (namely the contributions for the direct path and the target paths).

In order to obtain an absolute reference in bistatic or multistatic mode, it is therefore necessary to include a modulus of synchronization on the direct path before the receiver proper (FIG. 3), namely to reset the binary train with respect to an unknown delay $t_0$. The receiver then measures delays that are differential in relation to the delay of the direct path which is assumed to be known (by calibration).

Figure 4:
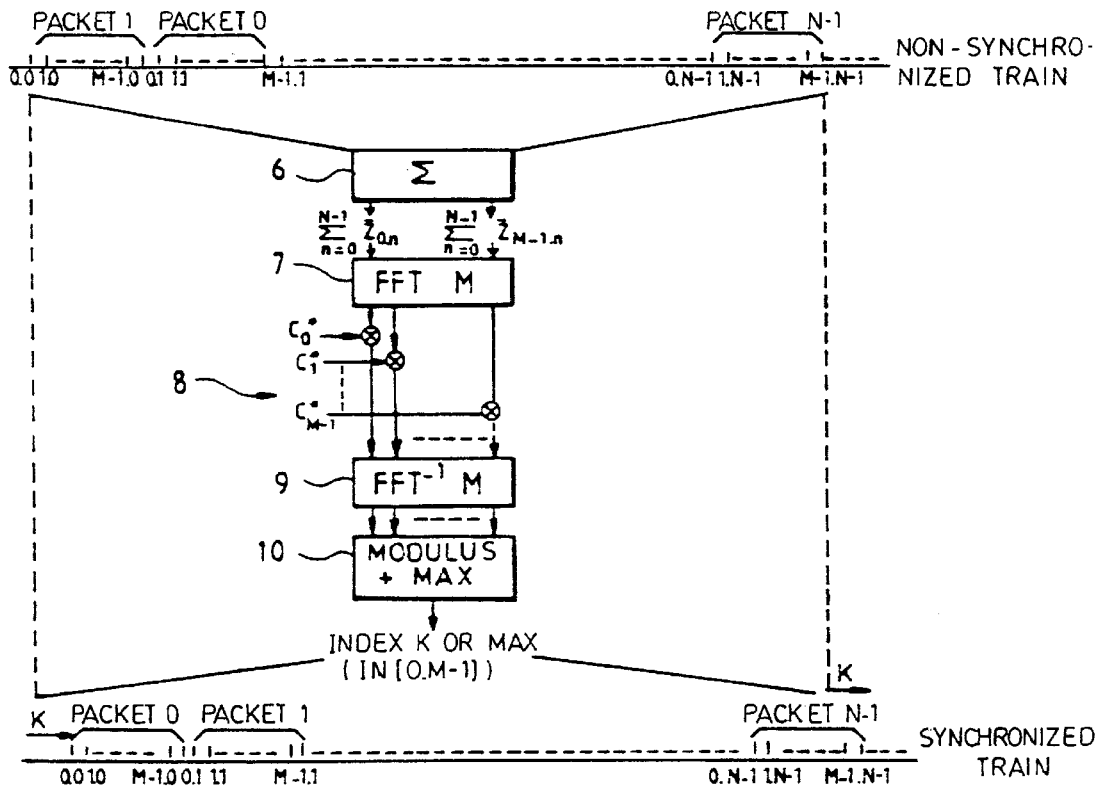
FIG. 4 is a simplified diagram of the synchronization pre-processing circuits of a receiver according to the invention.

This synchronization may be obtained simply by assuming that the direct path corresponds to the peak with the greatest power value after correlation in the zero-value Doppler gate. It may then be carried out by means of digital circuits as shown in the diagram of FIG. 4. It must be noted that this step of synchronization does not need to be performed before each processing of N packets (this reduces the computation load of the receiver).

Hereinafter, the term "reception channel" shall be applied to the processing of FIG. 3 and the term "synchronization channel" shall be applied to the processing of FIG. 4 (in the total reception diagram, these two processing operations get separated into two distinct channels).

The device of FIG. 4 receives, at its input, the N groups of M samples before they are processed and grouped together. All the groups are brought together in a summation circuit 6 that lets through only the zero-value Doppler component on all the samples and is connected to a circuit 7 carrying out an FFT on M points. The different outputs of the circuit 7 are multiplied at 8 by the corresponding coefficients $c_k^*$ (k ranging from 0 to M-1). They are then subjected to a reverse FFT on M points at 9. A circuit 10 extracts the modulus from the outputs of the circuit 9 and searches for the maximum power peak after correlation in the zero-value Doppler gate as specified here above. Thus, the value of the index k of this peak is obtained (with k ranging form 0 to M-1 as specified here above). The synchronization signal for the received packets is deduced therefrom.

A second constraint of implantation is related to the dynamic range of the signals to be processed. Indeed, the processing operations described here above are done in digital mode. They therefore assume a prior sampling and analog/digital conversion of the signals received after RF demodulation. The problem that then arises is that of the dynamic range of conversion. Indeed, the receiver should be capable of processing both the direct path (in bistatic mode, or the transmission leakage, namely the direct parasitic link between the transmitter and receiver of a monostatic station without going out of the transmitter/receiver station) and the signal returned by a target (reception channel). Now, there may exist a difference in power of 95 dB between these two signals, therefore requiring, in principle, a dynamic range of digital conversion of at least 16 bits. Furthermore (on the reception channel), in order to prevent the direct path or the transmission leakage from creating false alarms at output of the Doppler filters at non-zero velocities (owing to its very high power), it is necessary to reduce these signals, first of all by filtering, to a level comparable to that of the signals coming from the targets. A simple approach then consists of the removal, from the received samples, of the mean value obtained at output of the Doppler processing operation at zero velocity. It is necessary to carry out this subtraction in analog mode in order to reduce the dynamic range of conversion on the reception channel.

Figure 5:
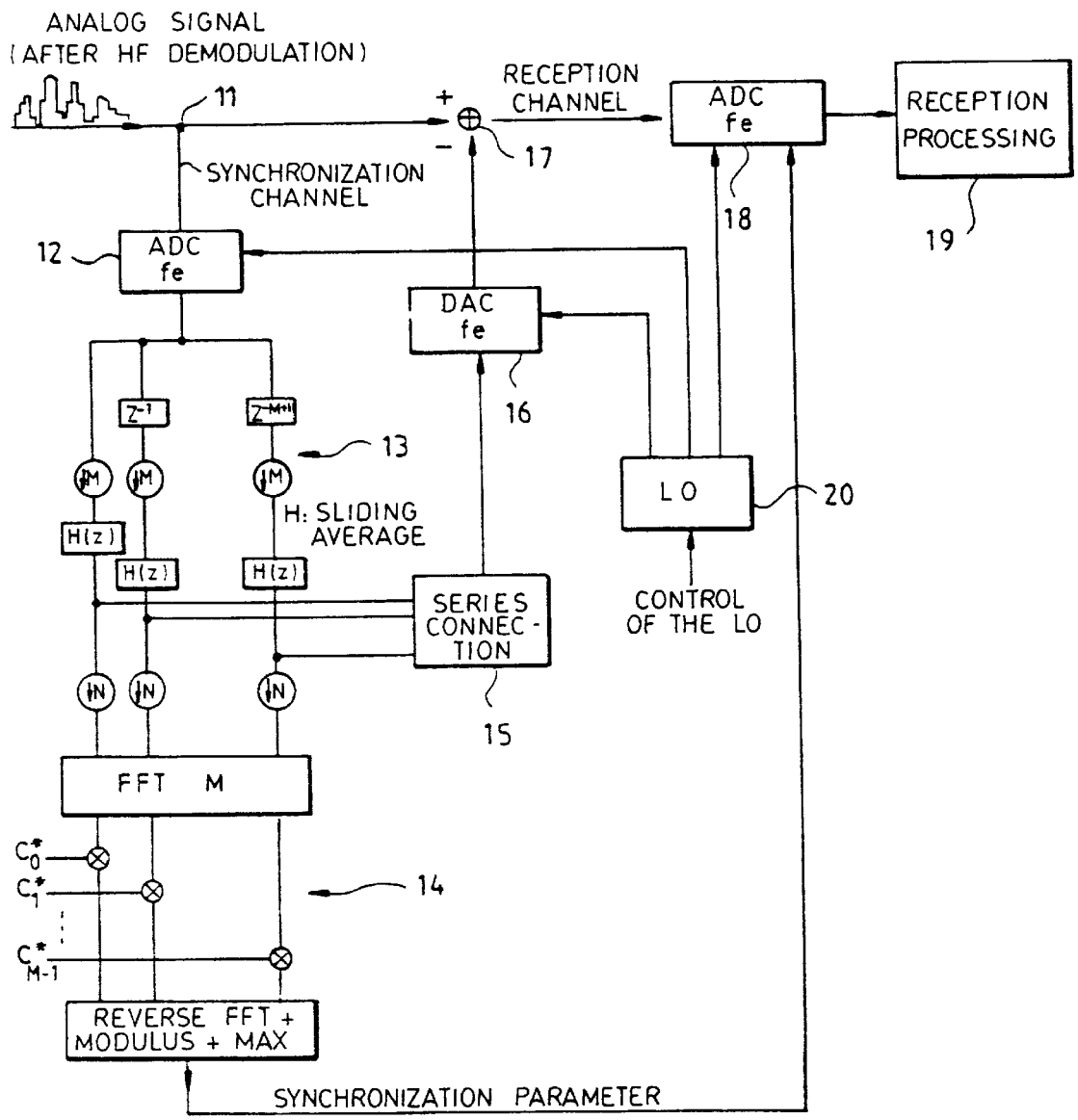
FIG. 5 is a block diagram of the synchronization channel of a receiver according to the invention.

FIG. 5 shows a possible approach for the making of this upline direct path synchronizing and filtering module which enables a reduction in the dynamic range of the reception channel (for the processing of the target signals) to an appropriate value of 8 or 12 bits. The filter H(z) takes a sliding average that enables the keeping of only the direct path in eliminating the targets with non-zero Doppler values.

This approach furthermore has the advantage of making a clear separation, in bistatic or multistatic mode, between the synchronization channel (working solely on the direct path) and the processing channel (reception channel). This synchronization channel is furthermore used for the digital servo-linking of the local oscillator of the receiver with that of the transmitter.

FIG. 5 shows a general block diagram of the synchronization path (except for the oscillator servo-linking device which is not shown). This figure again shows the synchronization part of the bistatic embodiment corresponding to FIG. 4 (with FFT of M points, multiplication by coefficients $c_k$, and reverse FFT). The only difference for this synchronization part lies in the computation of the sliding average in FIG. 5 through the filters H(z).

The block diagram of FIG. 5 shows circuits of a part of a receiver according to the invention. The input 11 of these circuits receives analog signals after RF demodulation in the receiver in which they are implanted. This input 11 is connected by an analog-digital converter 12 to a sliding average computation circuit 13 followed by a synchronization pre-processing circuit 14 which is that of FIG. 4. The circuit 13 is made in manner known per se by the connection of a filter H(z) to each of the outputs of the circuit 12. The outputs of the different filters H(z) are connected to a parallel-series converter 15 followed by a digital-analog converter 16 whose output is connected to an input of an adder 17 whose other input is connected to the input 11. The output of the adder 17 is connected to an analog-digital converter 18 followed by a processing circuit 19 which is the circuit of FIG. 3. A local oscillator 20 is connected to the different converters 12, 16, and 18.

To carry out the digital servo-linking of the local oscillator of the receiver in bistatic mode, the configuration used is still a configuration with one transmitter and one receiver. The fact that transmission and reception are at different locations appears also at the level of the generation of the control frequencies for the receiver (RF demodulation and sampling oscillators) which must be servo-linked with the transmission to maintain coherent processing. As explained here below, a digital retrieval of the transmission clock signals may be set up by a complementary processing on the synchronization channel.

Indeed, assuming that there is local generation (at transmission and at reception), the demodulation frequency $f_0'$ and sampling frequency $f_e'$ at reception are different and are not derived in the same way as those at transmission $f_0$ and $f_e$.

It is this difference that it is necessary to try and compensate for (recuperation of the rate) by servo-linking the local oscillators of the receiver with those of the transmitter.

The approach adopted entails a digital recovery of the rates of the clocks on the basis of the signal received from the direct part on the synchronization channel.

Let $\Delta f_0 = f_0' - f_0$ and $\Delta f_e = f_e' - f_e$. It is necessary to try and estimate $\Delta f_0$ and $\Delta f_e$ which take account of the poor locking of the frequencies of the receiver so as to generate the appropriate commands of the local oscillator.

It can then be shown (by simple but relatively painstaking computations that are not reproduced here) that the variation in time of the phase of the coefficients $d_k$ obtained at output of the FFT of the synchronization channel (FFT of M points of FIGS. 4 or 5 before multiplication by the coefficients $c_k^s$ *) is a linear function of the differences $\Delta f_e$ and $\Delta f_0$ (provided that it is assumed that the differences are small).

In other words, taking:

$\Delta \Phi(k)$=phase variation of the coefficient $d_k$ between the FFT of the instants n and n+1.

It is shown that:

$\Delta \Phi(k) = a.k + b.\Delta f_e + c.\Delta f_0$ the coefficients a, b and c being known constants. Under these conditions, a least squares algorithm applied to these phase differences (for k varying from 0 to M−1) enables an estimation of the unknown differences $\Delta f_0$ and $\Delta f_e$.

Figure 6:
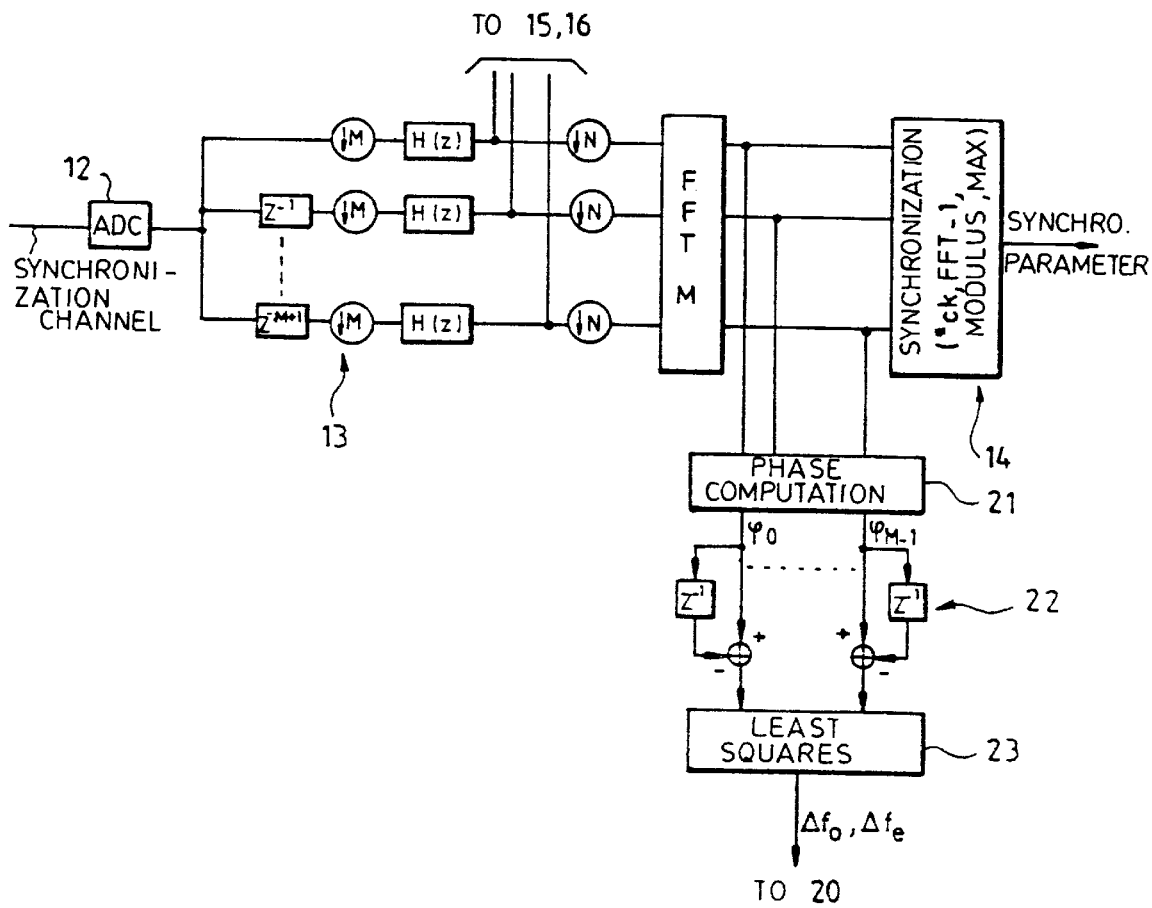
FIG. 6 is a block diagram of the digital warning circuits of the local oscillators of a receiver according to the invention; the devices shown in FIGS. 4 to 6 relate only to the case of a multistatic system.

This procedure for the servo-linking of the control frequencies in bistatic mode is summarized in FIG. 6. It must be noted that $\Delta f_0$ can either be used to control the oscillator for the generation of the demodulation frequency or be used to supply a complex multiplier on the temporal signal before reception processing (distance and Doppler processing), the demodulation oscillator being then left free.

FIG. 6 shows the synchronization channel of FIG. 5, namely the circuits 12, 13 and 14. The outputs of the FFT circuit 14 are connected to a circuit 21 for the computation of the phase of the different samples, followed by a stage 22 for the addition of the previous phase and a stage 23 for the computation of the least squares whose output controls the local oscillator (20 in FIG. 5).

The above-described system must ultimately lead to an absolute localization of the targets. This requires the capacity to process and hence achieve the discrimination, at a receiver, of the signals coming from different transmitters. An efficient degree of discrimination may be obtained by using sets of coefficients $c_k$ that are orthogonal between one transmitter and another. For example, by choosing coefficients $c_k$ having a modulus of one, the phase of which is chosen randomly and independently from one transmitter to another, a rejection of 10 $\log_{10}(M)$ dB of the undesirable transmitter, namely 27 dB for 512 carriers, is achieved in reception in the absence of noise. This rejection is quite sufficient inasmuch as a noise level of 19 dB at output of processing is sufficient to obtain a detection probability of 0.85 for a false alarm probability of $10^{-6}$.

Similarly, this discrimination of the coefficients $c_k$ of different transmitters enables the operations of synchronizing and servo-linking the local oscillators to be focused on a particular transmitter.

In the case of the use of an existing network of transmitters and receivers (for example a television network), the multistatic radar system obtained is particularly suited to the low-altitude monitoring of airborne machines owing to the orientation of the antennas of such a network.

To improve the performance characteristics of the radar system of the invention, it is advantageously possible to bring about a variation, in the course of time, of the coefficients $c_k$ after a whole number of times N periods of the signal transmitted. It is thus possible to get rid of the harmful effects of different parasites (clutter, parasitic echoes, jamming, etc.).

In order to make the system even more discreet, it is possible to choose the coefficients $c_k$ so that the transmitted signal resembles a fixed or moving television picture (a bar pattern for example).

Figure 7:
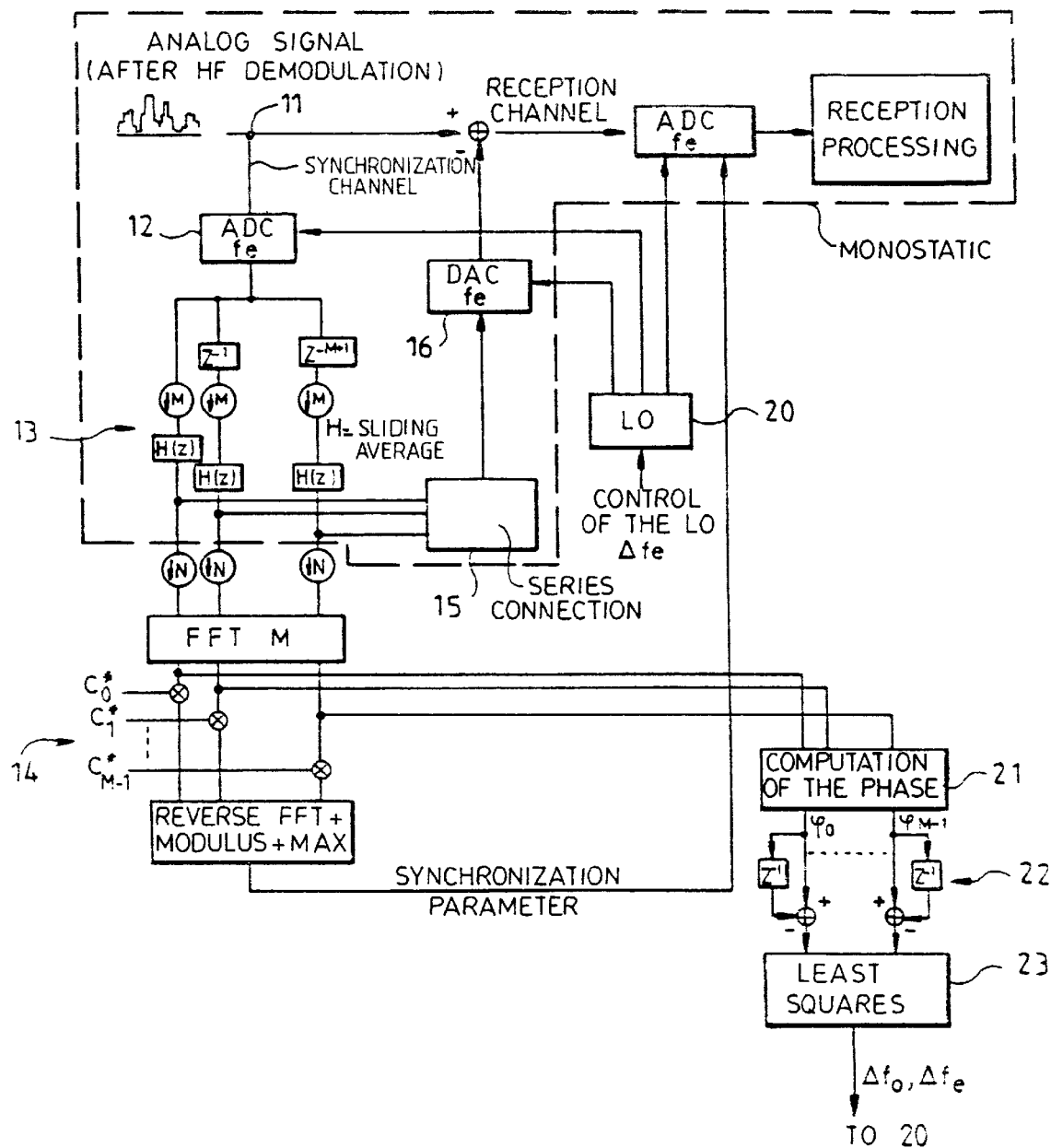
FIG. 7 shows a block diagram of the set of main processing circuits of a receiver according to the invention.

FIG. 7 shows a block diagram of the OFDM signal processing part of the receiver of the invention. This block diagram comprises the sub-units shown in FIGS. 3, 4, 5 and 6. The elements used only for a monostatic station are surrounded by a box of dashes.

Figure 8:
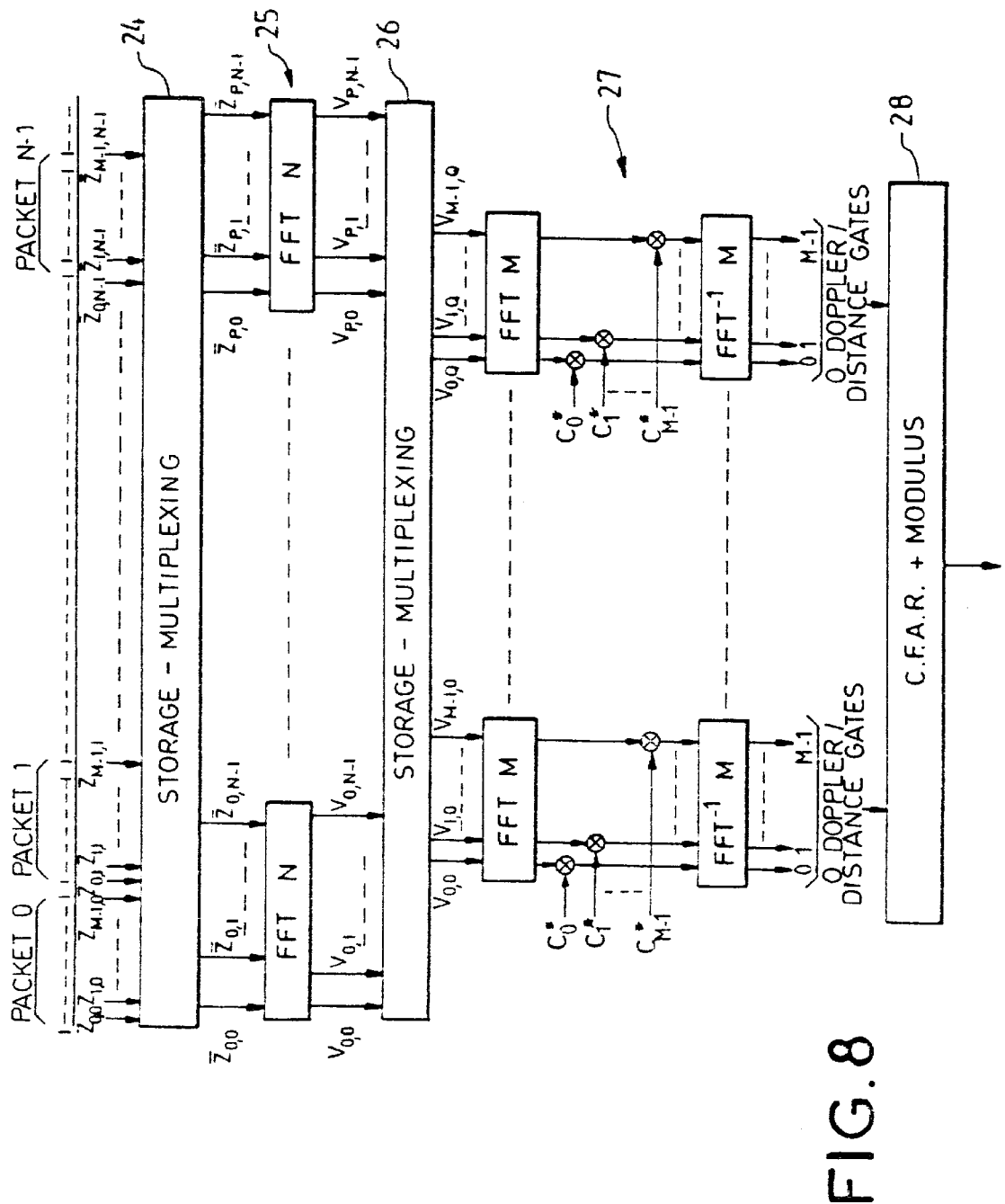
FIG. 8 shows a block diagram of an alternative embodiment of the circuits of FIG. 3.

FIG. 8 shows an advantageous embodiment of a variant of the circuits of FIG. 3. The signal received by the receiver is sampled in the same way as in the case of FIG. 3. The N packets of M samples are memorized in a stage 24 and then multiplexed to be sent to a stage 25 of P parallel-connected FFT processors each processing M/P groups, with $1 \leq P \leq M$. The stage 25 is followed by a stage 26 for the storage of M groups of N samples coming out of the FFT processors. This stage 26 also carries out the multiplexing of these samples in N groups of M samples. The samples of one and the same group belong to the same Doppler gate. The stage 26 is followed by a stage 27 comprising Q sets for the processing of distance gates, each of these sets processing N/Q Doppler gates, with $1 \leq Q \leq N$. As in the case of FIG. 3, each processing unit first of all carries out an FFT operation on the M samples of the same Doppler frequency and then the different samples are multiplied by $c_k^*$ (k ranging from 0 to M−1), and subjected to a reverse FFT operation (namely an $FFT^{-1}$ operation). The stage 27 is followed by a modulus-determining and CFAR stage 28 that is identical to the stage 4 of FIG. 3 and may be followed by a stage for searching for maximum values such as the stage 5.

In the receiver device described here above, the number of FFT processors may be reduced as a function of their elementary computation capacity by means of a storage of the signals to be processed. Advantageously, the storage operations on the one hand and the FFT and $FFT^{-1}$ operations on the other hand can be done successively by the same physical circuits if their processing capacities are compatible with the data bit rate received by the receiver.

What is claimed is:

1. A method of discrete radar detection comprising the steps of:
    at transmission, producing an encoded waveform, from a multicarrier signal, repeated on at least N periods, N being greater than or equal to 1, wherein said multicarrier signal is an orthogonal frequency divisional multiplexed (OFDM) signal with orthogonal carriers; and
    at reception, carrying out a matched filtering operation, a Doppler processing, and a distance processing of received signals.

2. A method according to claim 1, wherein the weighting coefficients of the carriers are complex numbers, fixed on N successive periods of the transmitted signal.

3. A method according to one of the claims 1, or 2 for a bistatic or multistatic system, wherein trains of signals received are synchronized on a direct path between the transmitter and the receiver.

4. A method according to claim 3, wherein the point of operation of the transmitter is backed off with respect to its nominal power in a ratio equal to the ratio of the peak power to the mean power of the OFDM signal.

5. A method according to claim 2, wherein the weighting coefficients are made to vary in the course of time after a whole number of times N periods of the transmitted signal.

6. A method according to claim 2, wherein the weighting coefficients are chosen so that the transmitted signal resembles a fixed or moving television picture.

7. A system of discrete radar detection comprising:
    at least one transmitter including a multicarrier encoded wave generator providing an orthogonal frequency divisional multiplexed (OFDM) encoded signal with orthogonal carriers wherein said encoded signal is repeated on at least N periods, N being greater than or equal to one; and
    one receiver including at least one distance gate processing stage and a Doppler gate processing state.

8. A detection system according to claim 7, for an encoded M-carrier wave, for an integration time of N periods during which the encoded wave is invariant, wherein the distance gate processing stage, of the receiver comprises N circuits for performing FFT,on M points, the outputs of these circuits are each multiplied by a weighting coefficient and this stage is followed a state of N circuits for performing reverse FFT on M points.

9. A detection system according to claim 8, wherein the distance gate processing stage of the receiver is preceded by a Doppler processing stage comprising M circuits for performing FFT on N points.

10. A system according to claim 7, wherein its receiver comprises a synchronization channel preceded by a circuit letting through only the zero-value Doppler component, this synchronization channel comprising an FFT circuit, a circuit for multiplication by weighting coefficients, a reverse FFT circuit and a modulus extraction and maximum power peak seeking circuit.

11. A detection system according to claim 7, wherein its receiver comprises an analog circuit for the reduction of the dynamic range connected between the output of the RF demodulator and the input of the distance gate and/or Doppler gate processing circuits.

12. A detection system according to claim 11, wherein the dynamic range reduction circuit comprises an analog-digital converter, a sliding average computation circuit, a synchronization preprocessing circuit, a parallel-series converter and a digital-analog converter.

* * * * *